(12) United States Patent
Jeon et al.

(10) Patent No.: US 11,599,495 B2
(45) Date of Patent: Mar. 7, 2023

(54) DEVICE FOR PERFORMING COMMUNICATION AND COMPUTING SYSTEM INCLUDING THE SAME

(71) Applicant: SK hynix Inc., Icheon-si (KR)

(72) Inventors: Yong Tae Jeon, Icheon-si (KR); Dae Sik Park, Icheon-si (KR); Seung Duk Cho, Icheon-si (KR)

(73) Assignee: SK hynix Inc.

(*) Notice: Subject to any disclaimer, the term of this patent is extended or adjusted under 35 U.S.C. 154(b) by 0 days.

(21) Appl. No.: 17/350,945

(22) Filed: Jun. 17, 2021

(65) Prior Publication Data
US 2022/0318180 A1 Oct. 6, 2022

(30) Foreign Application Priority Data
Apr. 1, 2021 (KR) .................. 10-2021-0042642

(51) Int. Cl.
G06F 13/42 (2006.01)

(52) U.S. Cl.
CPC .. G06F 13/4282 (2013.01); G06F 2213/0026 (2013.01)

(58) Field of Classification Search
CPC ................ G06F 13/4282; G06F 2213/0026
See application file for complete search history.

(56) References Cited

U.S. PATENT DOCUMENTS

| | | |
|---|---|---|
| 5,025,457 A | 6/1991 | Ahmed |
| 5,844,891 A | 12/1998 | Cox |
| 5,958,027 A | 9/1999 | Gulick |
| 6,029,194 A | 2/2000 | Tilt |
| 6,061,802 A | 5/2000 | Gulick |
| 6,279,058 B1 | 8/2001 | Gulick |
| 7,103,125 B1 | 9/2006 | Crutchfield et al. |

(Continued)

FOREIGN PATENT DOCUMENTS

| | | |
|---|---|---|
| KR | 101419292 B1 | 7/2014 |
| KR | 1020170124403 | 11/2017 |

OTHER PUBLICATIONS

PCI Express® Base Specification Revision 4.0 Version 1.0, PCI Express, Sep. 27, 2017, 1293 pages.

(Continued)

Primary Examiner — Henry Tsai
Assistant Examiner — Harry Z Wang
(74) Attorney, Agent, or Firm — Perkins Coie LLP

(57) ABSTRACT

Devices for performing communications are disclosed. In some implementations, a device includes: an upstream port for receiving data from or transmitting data to one or more external devices located on an upstream path through a link including a plurality of lanes; a lane margining controller coupled to the upstream port and for transmitting, via the upstream port, to the one or more external devices, a margin command for requesting a lane margining operation to acquire margin status information to indicate a margin of each of the plurality of lanes, and controlling the upstream port to receive the margin status information from the external devices; and a port setting controller coupled to be in communication with the upstream port to receive the margin status information and for determining a setting of the upstream port based on the margin status information.

18 Claims, 10 Drawing Sheets

(56) References Cited

U.S. PATENT DOCUMENTS

| | | |
|---|---|---|
| 7,295,578 B1 | 11/2007 | Lyle et al. |
| 8,285,884 B1 | 10/2012 | Norrie |
| 8,879,680 B2 | 11/2014 | Tresidder et al. |
| 9,337,934 B1 | 5/2016 | Agazzi et al. |
| 10,862,478 B2 | 12/2020 | Hwang |
| 2002/0024970 A1 | 2/2002 | Amaral et al. |
| 2002/0187798 A1 | 12/2002 | Young et al. |
| 2003/0122574 A1 | 7/2003 | Kushida |
| 2006/0209684 A1 | 9/2006 | Bei |
| 2007/0001882 A1 | 1/2007 | Zhang et al. |
| 2007/0041391 A1 | 2/2007 | Lin et al. |
| 2007/0177701 A1 | 8/2007 | Thanigasalam |
| 2007/0204137 A1 | 8/2007 | Tran |
| 2008/0100350 A1 | 5/2008 | Pernia |
| 2008/0141063 A1 | 6/2008 | Ridgeway et al. |
| 2009/0059962 A1 | 3/2009 | Schmidt et al. |
| 2009/0317013 A1 | 12/2009 | Yang et al. |
| 2010/0061424 A1 | 3/2010 | Germann et al. |
| 2010/0114584 A1 | 5/2010 | Weng |
| 2012/0140781 A1 | 6/2012 | Green |
| 2012/0257699 A1 | 10/2012 | Choi et al. |
| 2013/0235887 A1 | 9/2013 | Mamidwar et al. |
| 2013/0343528 A1 | 12/2013 | Polland et al. |
| 2014/0006675 A1* | 1/2014 | Meir ................... G06F 11/0745 710/314 |
| 2014/0101356 A1 | 4/2014 | Sonoda et al. |
| 2015/0350656 A1 | 12/2015 | Chung et al. |
| 2016/0092335 A1* | 3/2016 | Boelter ................. G06F 11/349 714/47.1 |
| 2016/0139622 A1 | 5/2016 | Barner |
| 2016/0277302 A1 | 9/2016 | Olsen |
| 2018/0004686 A1 | 1/2018 | Chen |
| 2018/0089125 A1* | 3/2018 | Berke .................. G06F 13/4282 |
| 2018/0267850 A1* | 9/2018 | Froelich ................ H04L 1/0061 |
| 2018/0285227 A1 | 10/2018 | Sharma et al. |
| 2018/0331864 A1* | 11/2018 | Das Sharma ........... H04L 27/01 |
| 2019/0258600 A1* | 8/2019 | Das Sharma ....... G06F 13/4045 |
| 2020/0132760 A1 | 4/2020 | Froelich et al. |
| 2020/0249275 A1* | 8/2020 | Froelich ........... G01R 31/31715 |
| 2020/0364108 A1 | 11/2020 | Froelich et al. |
| 2020/0364129 A1 | 11/2020 | Das Sharma |
| 2021/0050941 A1* | 2/2021 | Das Sharma ........... H04L 1/203 |
| 2021/0376716 A1 | 12/2021 | Liu |
| 2021/0390074 A1 | 12/2021 | Park |
| 2021/0391973 A1 | 12/2021 | Jeon et al. |
| 2022/0022770 A1 | 1/2022 | Ouwerkerk |

OTHER PUBLICATIONS

Froelich, Dan, et al., "PCIe® 5.0 Electrical Update", PCI-SIG 2018, 49 pages.

Stumpf, Martin F., "Analyzing the Real Jitter Performance of an SSC Clock", PCI-SIG 2018, 32 pages.

Mobin, M. et al, "PCIe Gen4 Standards Margin Assisted Outer Layer Equalization for Cross Lane Optimization in a 16GT/s PCIe Link", DesignCon 2017, 26 pages.

* cited by examiner

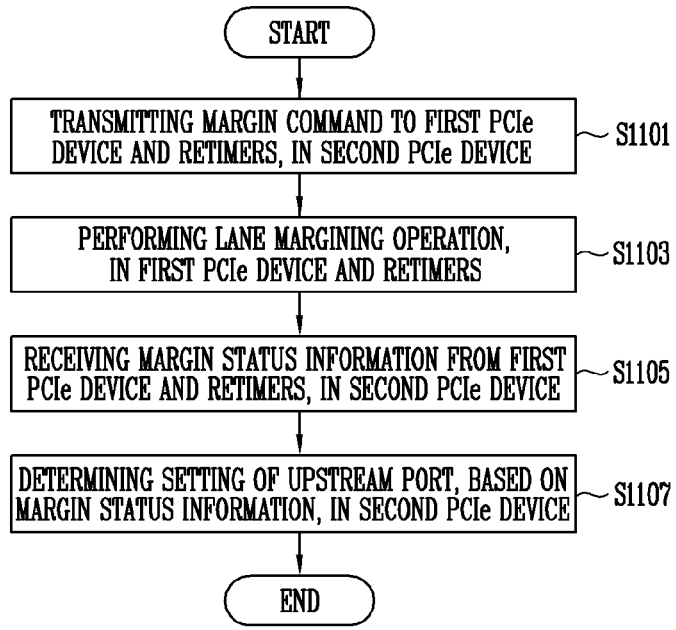
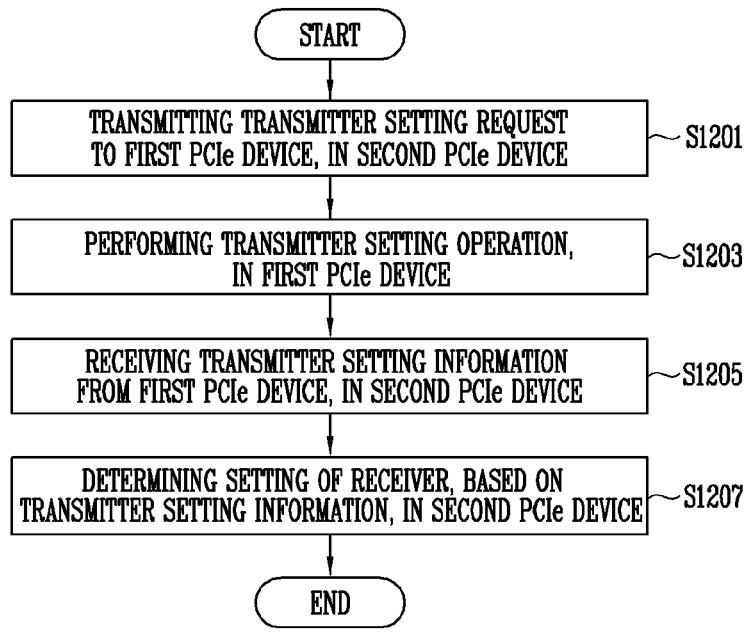

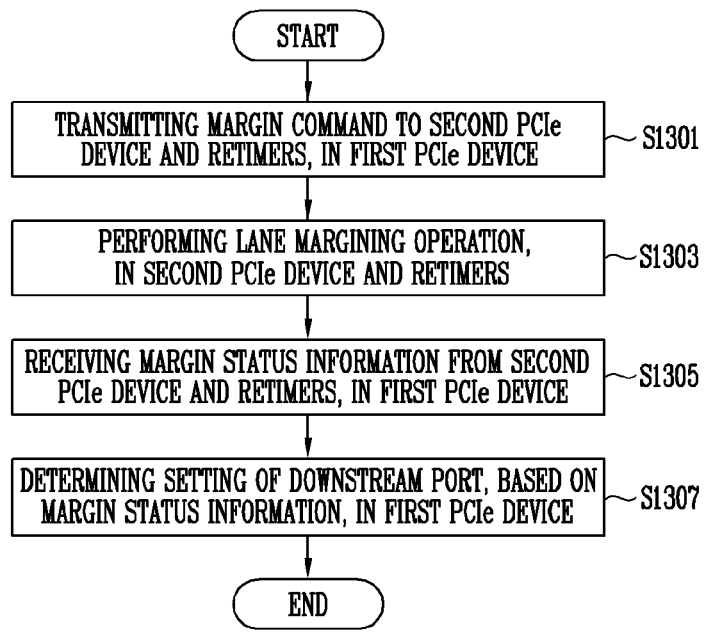

DEVICE FOR PERFORMING COMMUNICATION AND COMPUTING SYSTEM INCLUDING THE SAME

CROSS-REFERENCE TO RELATED APPLICATION

This patent document claims the priority and benefits of the Korean patent application number 10-2021-0042642, filed Apr. 1, 2021, which is incorporated herein by reference in its entirety.

TECHNICAL FIELD

The disclosed technology generally relates to an electronic device, and more particularly, to a device for performing communication and a computing system including the same.

BACKGROUND

Computer buses such as peripheral component interconnect (PCI) are used to connect peripheral devices to a computer system. PCI express (PCIe) is a high-speed computer bus standard that includes a physical communication layer as a high speed serial interface while maintaining software compatibility with the PCI standard.

A data storage device is used to store or provide data in response to the requests from a host device such as a computer or a smart phone. Such a data storage device may include one or more memory devices for storing data and a memory controller for controlling the one or more memory devices. The memory devices can be classified into a volatile memory device and a nonvolatile memory device.

The volatile memory device only retains its data while the device is powered and loses its data when power is lost. Examples of the volatile memory device may include a Static Random Access Memory (SRAM) and a Dynamic Random Access Memory (DRAM).

The nonvolatile memory device retains stored data even in the absence of power supply and thus does not lose its data when power is lost. Examples of the nonvolatile memory device may include a Read Only Memory (ROM), a Programmable ROM (PROM), an Electrically Programmable ROM (EPROM), an Electrically Erasable ROM (EEROM), and a flash memory.

SUMMARY

The embodiments of the disclosed technology relate to a peripheral component interconnect express (PCIe) device that can control a lane margining operation in an upstream port, and a computing system including the PCIe device.

In some implementations of the disclosed technology, a device for performing communication between components in a computing system may include an upstream port structured to receive data from or transmit data to one or more external devices located on an upstream path through a link including a plurality of lanes structured to include differential signaling pairs for receiving and transmitting data; a lane margining controller coupled to the upstream port and configured to transmit, via the upstream port, to the one or more external devices, a margin command for requesting a lane margining operation to acquire margin status information to indicate a margin of each of the plurality of lanes, and control the upstream port to receive the margin status information from the external devices; and a port setting controller coupled to be in communication with the upstream port to receive the margin status information and operable to determine a setting of the upstream port based on the margin status information.

In some implementations of the disclosed technology, a computing system may include a first device that is structured include a downstream port and to receive and transmit data via the downstream port according to peripheral component interconnect express (PCIe) standard; and a second device structured to include an upstream port connected to the downstream port of the first device through a link including a plurality of lanes, wherein the second device is configured to: receive and transmit data with the first device via the upstream port according to the peripheral component interconnect express (PCIe) standard, transmit a margin command to the first device through the upstream port, receive margin status information that indicates a margin of each of the plurality of lanes as a response to the margin command from the first device, and determine a setting of the upstream port based on the margin status information.

In some implementations of the disclosed technology, a computing system may include a downstream port structured to interconnect components of the computing system in a downstream path; and an upstream port structured to interconnect components of the computing system in an upstream path and connected to the downstream port through a link including a plurality of lanes, wherein each of the downstream port and the upstream port is configured to: generate a margin command for requesting a lane margining operation to acquire margin status information to indicate a margin of each of the plurality of lanes, and transmit the margin command to the upstream port or the downstream port or receives the margin command from the downstream port.

In some implementations of the disclosed technology, a PCIe device may include an upstream port connected to one or more external devices located on an upstream path through a link including a plurality of lanes; a lane margining controller configured to transmit, to the external devices, a margin command for requesting a lane margining operation of acquiring margin status information of each of the plurality of lanes, and control the upstream port to receive the margin status information from the external devices; and a port setting controller configured to determine a setting of the upstream port, based on the margin status information.

In some implementations of the disclosed technology, a computing system may include a first PCIe device including a downstream port; and a second PCIe device configured to include an upstream port connected to the downstream port through a link including a plurality of lanes, transmit a margin command to the first PCIe device through the upstream port, receive margin status information of each of the plurality of lanes as a response to the margin command from the first PCIe device, and determine a setting of the upstream port, based on the margin status information.

In some implementations of the disclosed technology, a computing system may include a downstream port; and an upstream port connected to the downstream port through a link including a plurality of lanes, wherein each of the downstream port and the upstream port generates a margin command for requesting a lane margining operation of acquiring margin status information of each of the plurality of lanes, and transmits the margin command to the upstream port or the downstream port or receives the margin command from the downstream port.

BRIEF DESCRIPTION OF THE DRAWINGS

FIG. 11 is a flowchart illustrating a method for determining a setting of an upstream port based on an embodiment of the disclosed technology.

FIG. 12 is a flowchart illustrating a method for determining a setting of a receiver based on an embodiment of the disclosed technology.

FIG. 13 is a flowchart illustrating a method for determining a setting of a downstream port based on an embodiment of the disclosed technology.

DETAILED DESCRIPTION

The technology disclosed in this patent document can be implemented in some embodiments to provide data storage devices and data storage methods. The specific structural or functional description disclosed herein is merely illustrative for the purpose of describing embodiments according to the concept of the disclosed technology. The embodiments according to the concept of the disclosed technology can be implemented in various forms, and cannot be construed as limited to the embodiments set forth herein.

Figure 1:
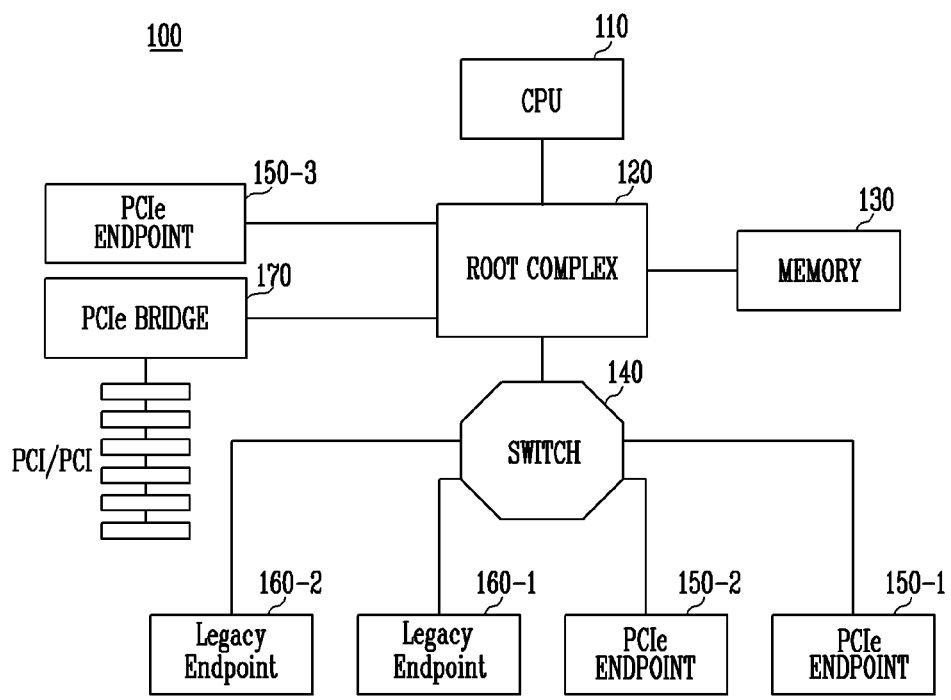
FIG. 1 is a diagram illustrating an example of a computing system based on an embodiment of the disclosed technology.

FIG. 1 is a diagram illustrating an example of a computing system based on an embodiment of the disclosed technology.

Referring to FIG. 1, a computing system 100 may include a central processing unit (CPU) 110, a root complex 120, a memory 130, a switch 140, a peripheral component interconnect express (PCIe) endpoints 150_1 to 150_3, legacy endpoints 160_1 and 160_2, and a PCIe bridge 170.

The computing system 100 may be an electronic device which supports communication using a PCIe interface. The computing system 100 may be a PC, a laptop computer, or a mobile computing device, and include an expansion card, an expansion board, an adaptor card, an add-in card, or an accessary card. Also, the computing system 100 may include a printed circuit board (PCB) which can be inserted into an electrical connector or an expansion slot on a mother board of the computing system 100 so as to provide an additional function to the computing system 100 through an expansion bus. Also, the computing system 100 may include a storage device such as a solid state drive (SSD), and include a graphic card, a network card, a USB card, or the like.

The CPU 110 may be electrically connected to each component of the computing system 100, and control each operation of the computing system 100. Specifically, the CPU 110 may control components of hardware or software, which is connected to the CPU 110, by driving an operating system or an application program, and perform various data processing and calculations. Also, the CPU 110 may execute software or an application, which is used to control an operation of the computing system 100.

The root complex 120 may be a root hub, a controller hub, or a root controller in a PCIe interconnect architecture. For example, the root complex 120 may include a chipset, a memory controller hub (MCH), a north bridge, an interconnect controller hub (ICH), a south bridge, and a root controller/hub. Also, the root complex 120 may connect the CPU 110 and the memory 130 to an input/output (I/O) hierarchy. The root complex 120 may support a peer-to-peer (P2P) routing. The root complex 120 may include at least one host bridge and at least one root port. The root complex 120 may support one or more PCIe ports. In some implementations, a port may indicate the interface between a PCIe component and a link and include differential transmitters and receivers. In some implementations, an upstream port is a port that points in the direction of the root complex, and a downstream port is a port that points away from the root complex.

The memory 130 may store data, commands, or a program code, necessary for an operation of the computing system 100. In some implementations, the memory 130 may store program codes for executing one or more operating systems (OSs) and one or more virtual machines (VMs) and program codes for executing a virtualization intermediary (VI) for managing the VMs. Also, the memory 130 may be implemented as a volatile memory device such as a DRAM or an SRAM.

The switch 140 may route a packet or message upstream or downstream. Specifically, the switch 140 may route the packet or message upstream to a layer toward the root complex 120 from a PCIe endpoint (e.g., 150_1). Also, the switch 140 may route the packet or message downstream to a layer toward a PCIe endpoint (e.g., 150_2) from the root complex 120.

The switch 140 may include a logic assembly of a plurality of virtual PCI-to-PCI bridge devices. A device which may be connected to the switch 140 may include an internal or external device or a component, which is connected to electronic systems such as a network interface controller (NIC), an add-in card, an audio processor, a network processor, a hard-drive, a storage device, a CD/DVD ROM, a monitor, a printer, a mouse, a keyboard, a router, a mobile storage device, a firewire device, a universal serial bus (USB), a scanner, and other input/output devices. Although not shown in detail, the device may include a PCIe-to-PCI/PCI-X bridge supporting a PCI device of legacy or another version.

In some implementations, the root complex 120 may be connected to an endpoint. The endpoint may represent a type of function which may become a requester or completer of a PCIe transaction. Here, the requester may include a device that originates a transaction in a PCIe architecture, and the completer may include a device addressed or targeted by a requester. The endpoint may be classified into a legacy endpoint and a PCIe endpoint. In some implementations, endpoints are devices other than root complex and switches that are requesters or completers of PCIe transactions.

The PCIe endpoints 150_1 to 150_3 and the legacy endpoints 160_1 and 160_2 may serve as the requester or completer of the PCIe transaction. A transaction layer packet (TLP) communicated through the PCIe endpoints 150_1 to 150_3 and the legacy endpoints 160_1 and 160_2 provides a configuration space header. Also, the PCIe endpoints 150_1 to 150_3 and the legacy endpoints 160_1 and 160_2 provide a configuration request as a completer.

The PCIe endpoints 150_1 to 150_3 and the legacy endpoints 160_1 and 160_2 may be divided based on the size of a memory transaction. For example, when an endpoint supports a memory transaction exceeding 4 GB, the endpoint may be categorized as the PCIe endpoints 150_1 to 150_3. When an endpoint does not support a memory transaction exceeding 4 GB, the endpoint may be the legacy endpoints 160_1 and 160_2. The PCIe endpoints 150_1 to 150_3 does not generate any input/output request, but the legacy endpoints 160_1 and 160_2 may provide or generate an input/output request. In addition, the PCIe end point 150_3 may communicate a TPL with the root complex 120. In addition, PCI/PCI-X may communicate a TLP with the root complex 120 through the PCIe bridge 170. The PCIe endpoints 150_1 and 150_2 or the legacy endpoints 160_1 and 160_2 may communicate a TLP with the switch 140.

The PCIe endpoints 150_1 to 150_3 may be a function having a type 00*h* configuration space header. The PCIe endpoints 150_1 to 150_3 may support a configuration request as a completer. A PCIe compatible software driver and an application program may be made such that any lock semantic is not used when the PCIe endpoints 150_1 to 150_3 are accessed. The PCIe endpoints 150_1 to 150_3 operating as the requester of the memory transaction may generate an address greater than 4 GB. When an interrupt resource is requested, the PCIe endpoints 150_1 to 150_3 may be necessary to support message signaled interrupt (MSI), MSI-X, or both of them. When the MSI is implemented, the PCIe endpoints 150_1 to 150_3 may support a 64-bit message address version of an MSI functional structure. A minimum memory address range requested by a base address register may be 128 bytes. The PCIe endpoints 150_1 to 150_3 may exhibit in one of hierarchy domains started in the root complex 120.

The legacy endpoints 160_1 and 160_2 may be a function that includes a type 00h configuration space header. The legacy endpoints 160_1 and 160_2 may support a configuration request as a completer. The legacy endpoints 160_1 and 160_2 may support an I/O request as the completer. The legacy endpoints 160_1 and 160_2 may accept an I/O request for one or both of positions 80*h* and 84*h*, regardless of the I/O decode configuration of a corresponding endpoint. The legacy endpoints 160_1 and 160_2 may generate an I/O request. The legacy endpoints 160_1 and 160_2 may include extended configuration space capabilities. It is unnecessary for the legacy endpoints 160_1 and 160_2 operating as the requester of the memory transaction to generate an address having 4 GB or more. When an interrupt resource is requested, the legacy endpoints 160_1 and 160_2 are necessary to support the MSI, the MSI-X, or both of them. When the MSI is implemented, the legacy endpoints 160_1 and 160_2 may support a 32-bit or 64-bit message address version of the MSI functional structure. The legacy endpoints 160_1 and 160_2 may support 32-bit address specification with respect to the base address register which requests a memory resource. The legacy endpoints 160_1 and 160_2 may exhibit in one of the hierarchy domains started in the root complex 120.

Figure 2:
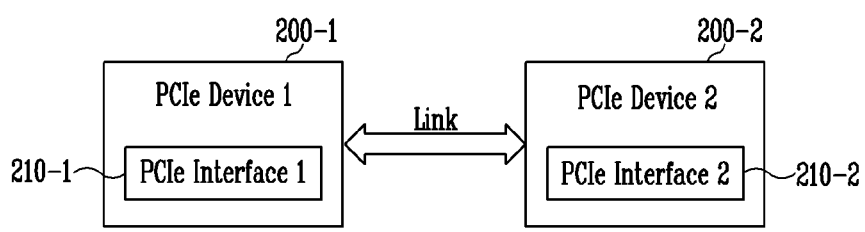
FIG. 2 is a diagram illustrating a peripheral component interconnect express (PCIe) device based on an embodiment of the disclosed technology.

FIG. 2 is a diagram illustrating a PCIe device based on an embodiment of the disclosed technology.

Referring to FIG. 2, the PCIe device may include a PCIe interface. In some implementations, the PCIe device may be an electronic device which supports transmission/reception using the PCIe interface. For example, a first PCIe device 200-1 or a second PCIe device 200-2 may be any one of the root complex 120, the switch 140, the PCIe endpoints 150_1 to 150_3, the legacy endpoints 160_1 and 160_2, and the PCIe bridge 170, which are shown in FIG. 1.

Also, the first PCIe device 200-1 or the second PCIe device 200-2 may perform communication by using a first PCIe interface 210-1 or a second PCIe interface 210-2. Specifically, the first PCIe device 200-1 may convert data to be transmitted from the second PCIe device 200-2 into a protocol suitable for communication by using the first PCIe interface 210-1. In addition, the first PCIe device 200-1 and the second PCIe device 200-2 may form a link. The first PCIe device 200-1 and the second PCIe device 200-2 may communicate with each other through the formed link. For example, the first PCIe device 200-1 or the second PCIe device 200-2 may transmit/receive a packet through the link.

Figure 3:
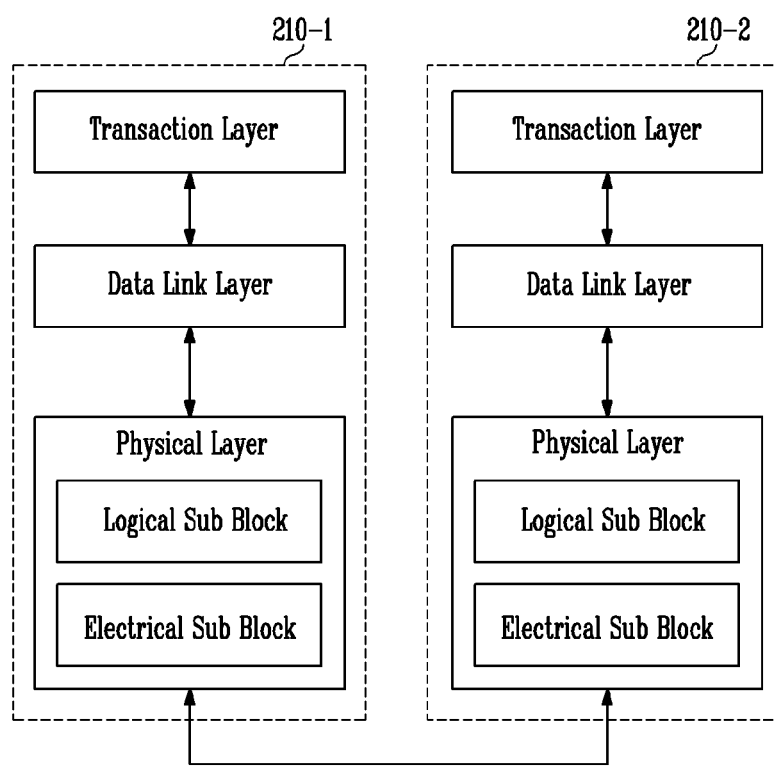
FIG. 3 is a diagram illustrating a PCIe interface based on an embodiment of the disclosed technology.

FIG. 3 is a diagram illustrating a PCIe interface based on an embodiment of the disclosed technology.

Referring to FIG. 3, a first PCIe interface 210-1 and a second PCIe interface 210-2 are illustrated. The first PCIe interface 210-1 and the second PCIe interface 210-2 may be formed in the same structure, and therefore, the first PCIe interface 210-1 will be mainly described.

PCIe layers included in the first PCIe interface 210-1 may include three discrete logical layers. For example, the first PCIe interface 210-1 may include a transaction layer, a data link layer, and a physical layer. Each of the layers may include two sections. One section may process outbound (or transmitted) information, and the other may process inbound (or received) information. Also, the first PCIe interface 210-1 may use packets to communicate information between other PCIe interfaces.

An upper layer in the structure of the PCIe interface may be the transaction layer. The transaction layer may assemble and disassemble transaction layer packets (TLPs). Also, the transaction layer may implement a split transaction, which allows another traffic to be transferred through a link while a target system assembles data necessary for a response. In some implementations, four transaction address spaces may include a configuration address space, a memory address space, an input/output address space, and a message address space. A memory space transaction may include one or more of read and write requests to transfer data to/from a memory-mapped location. In one example, the memory space transaction may use two different address formats, e.g., a short address format, such as a 32-bit address, or a long address format, such as 64-bit address. A configuration space transaction may be used to access a configuration space of the PCIe devices. A transaction to the configuration space may include read and write requests. A message space transaction (or message) may be defined to support in-band communication between PCIe devices.

The transaction layer may store link configuration information or others. Also, the transaction layer may generate a TLP, or convert a received TLP into a payload or status information.

A middle layer in the structure of the PCIe interface may be the data link layer, and the data link layer may perform a function of an intermediate stage between the transaction layer and the physical layer. A major function of the data link layer may include link management and data integrity including error detection and error correction. Specifically, a transmission side of the data link layer may accept TLPs assembled in the transaction layer, provide a data protection code, or calculate a TLP sequence number. Also, the transmission side of the data link layer may transmit the data protection code and the TLP sequence number to the physical layer such that the data protection code and the TLP sequence number are transmitted through the link. A reception side of the data link layer may check the data integrity of TLPs received from the physical layer, and transmit the TLPs to the transaction layer so as to perform additional processing.

The physical layer may include circuitry for an interface operation. The circuitry may include a driver, an input buffer, a series-parallel conversion circuit, a parallel-series conversion circuit, phase locked loops (PLLs), and an impedance matching circuit.

Also, the physical layer may include a logical sub-block and an electrical sub-block, which physically transmit a packet to an external PCIe device. The logical sub-block may perform a role necessary for a digital function of the physical layer. In relation to this, the logical sub-block may include a transmission section for preparing sending information to be transmitted by the physical sub-block and a reception section for identifying and preparing information received before the received information is transferred to the data link layer. The physical layer may include a transmitter and a receiver. The transmitter may receive a symbol transmitted to an external device as the transmitter is serialized by the logical sub-block. In addition, the receiver may receive serialized symbols from the external device, and convert the received symbol into a bit stream. The bit stream may be deserialized to be supplied to the logical sub-block. For instance, the physical layer may convert TLPs received from the data link layer into a serialized format, and convert a packet received from the external device into a deserialized format. Also, the physical layer may include logical functions associated with interface initialization and maintenance.

Although the structure of the first PCIe interface 210-1 and the second PCIe interface 210-2 is exemplarily illustrated in FIG. 3, the structure of the first PCIe interface 210-1 and the second PCIe interface 210-2 may include an arbitrary form such as a quick path interconnect structure, a next generation high performance computing interconnect structure, or another hierarchical structure.

Figure 4:
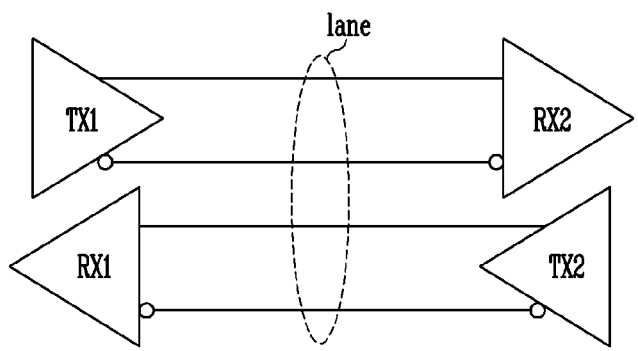
FIG. 4 is a diagram illustrating a transmitter, a receiver, and a lane based on an embodiment of the disclosed technology.

FIG. 4 is a diagram illustrating a transmitter, a receiver, and a lane based on an embodiment of the disclosed technology.

Referring to FIG. 4, a first transmitter TX1, a second transmitter TX2, a first receiver RX1, and a second receiver RX2 are illustrated. A lane may include a path that includes differentially driven signaling pairs. In some implementations, a lane may include two differential signaling pairs, with one pair for receiving data and the other for transmitting data. For example, a lane may include a transmission path pair configured for transmission and a reception path pair configured for reception. A PCIe device may include a transmission logic for transmitting data to another PCIe device and a reception logic for receiving data from another PCIe device. For example, the lane may include two transmission paths connected to the first transmitter TX1 and two reception paths connected to the first receiver RX1.

The transmission path may include an arbitrary path for transmitting data, such as a transmission line, a copper line, an optical line, a wireless communication channel, an infrared communication link, or another communication path. In addition, the reception path may include a path that is implemented identically to the transmission path although it is used for reception.

Connection between two PCIe devices, e.g., the first PCIe device 200-1 and the second PCIe device 200-2 may be a link. The link may support one or more lanes. For example, the link may include a plurality of lanes. In addition, each lane may include a set of differential signal pairs (one pair for transmission and one pair for reception). The differential signal may include signal pairs which have the same frequency and the same amplitude but have phases opposite to each other. For example, when a first signal is at a rising edge at which the first signal is toggled from 0 to V+, a second signal may be at a falling edge at which the second signal is toggled from 0 to V−. The PCIe device can use signal integrity, e.g., more satisfactory electrical characteristics such as cross-coupling, voltage overshoot/undershoot, and ringing, by using the differential signal. The PCIe device can more rapidly adjust a transmission frequency. Also, the link may include a plurality of lanes so as to adjust a bandwidth. For example, the link may include 1 lane, 2 lanes, 4 lanes, 8 lanes, 12 lanes, 32 lanes, 64 lanes, or the like.

Figure 5:
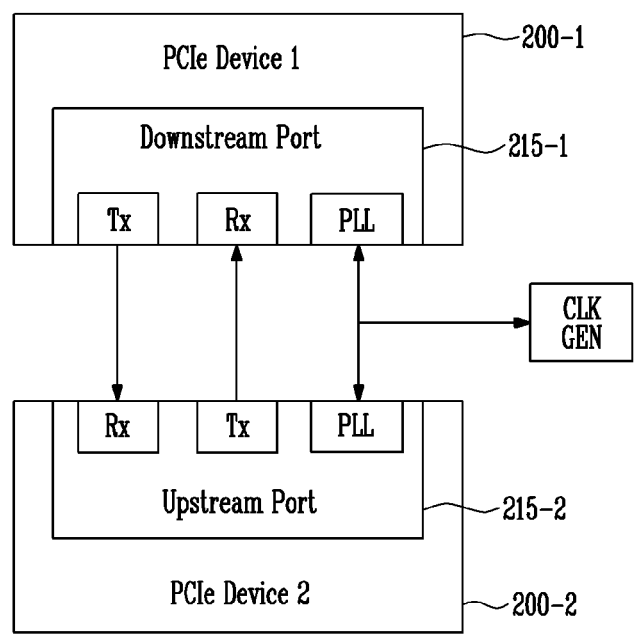
FIG. 5 is a diagram illustrating a port based on an embodiment of the disclosed technology.

FIG. 5 is a diagram illustrating a port based on an embodiment of the disclosed technology.

Referring to FIG. 5, there are illustrated a downstream port 215-1 and an upstream port 215-2 respectively included in a first PCIe device 200-1 and a second PCIe device 200-2.

In some implementations, the first PCIe device 200-1 may be a layer upper than that of the second PCIe device 200-2, and data movement and transmission to an upper layer may be referred to as upstream. On the contrary, data movement and transmission to a lower layer may be referred to as downstream. For example, referring to FIG. 1, the switch 140 may support routing of the upstream and the downstream. Specifically, the upstream may be routing of a packet or message upstream to a layer toward the root complex 120 from a PCIe endpoint (e.g., 150_1), and the downstream may be routing of a packet or message downstream to a layer toward a PCIe endpoint (e.g., 150_2) from the root complex 120.

In some implementations, a first PCIe device 200-1 that includes the downstream port 215-1 may be referred to as an "upstream component." The upstream component may include the root complex 120 or the switch 140, which is shown in FIG. 1. In addition, the second PCIe device 200-2 including the upstream port 215-2 may be referred to as a "downstream component." The downstream component may represent any one of the switch 140, the PCIe endpoints 150_1 to 150_3, the legacy endpoints 160_1 and 160_2, and the PCIe bridge 170, which are shown in FIG. 1.

Each of the downstream port 215-1 and the upstream port 215-2 may include a transmitter Tx, a receiver Rx, and a phase locked loop (PLL) circuit. The PLL circuit may generate a clock signal to be supplied to the transmitter Tx or the receiver Rx by using a clock signal provided from a clock signal generator CLK GEN. The PLL circuit may generate a clock signal with a changed frequency by multiplying a signal received from the clock signal generator CLK GEN. For example, the PLL circuit may multiply a reference clock signal REFCLK having a frequency of 100 MHz into a clock signal having a frequency of 2.5 GHz. The transmitter Tx may convert a parallel data signal into a serial data signal by using an output signal of the PLL circuit, and transmit the serial data signal to the external device, e.g., an external PCIe device. The receiver Rx may receive a serial data signal transmitted from the external device, and generate a clock signal for recovering the received serial data signal and a clock signal for converting the recovered serial data signal into a parallel data signal by using the output signal of the PLL circuit. The clock signal generator CLK GEN may generate a reference clock signal REFCLK used for an operation of a PCIe interface. The operation of the PCIe interface may be communication with the external PCIe device.

Figure 6:
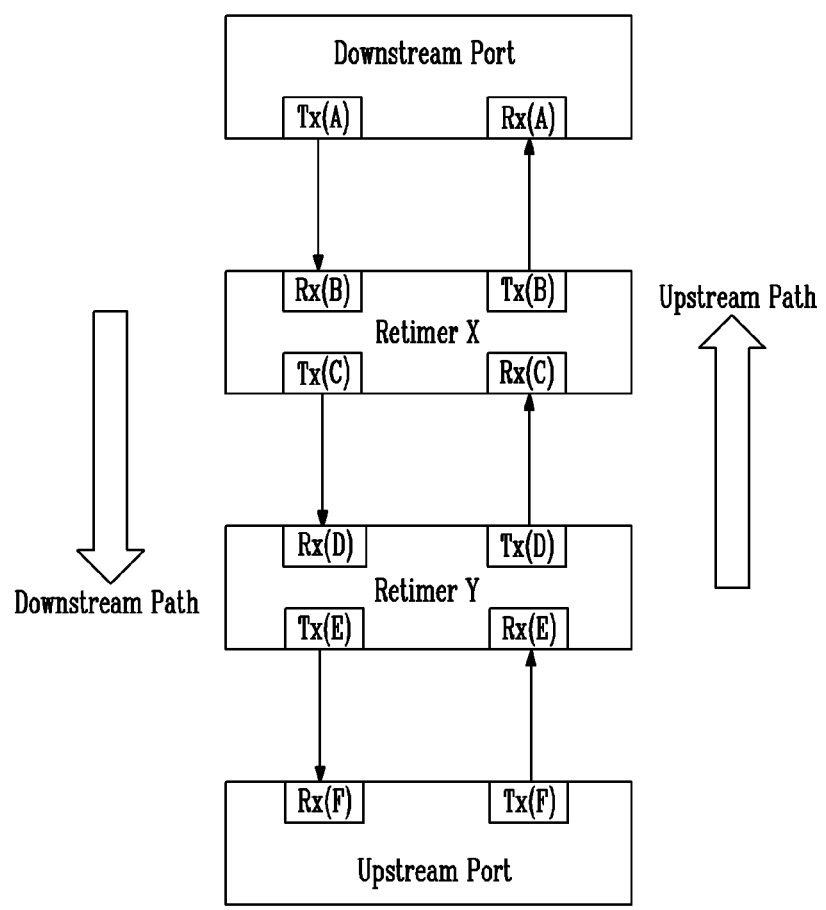
FIG. 6 is a diagram illustrating an interconnect structure that includes one or more retimers based on an embodiment of the disclosed technology.

FIG. 6 is a diagram illustrating an interconnect structure that includes one or more retimers based on an embodiment of the disclosed technology.

Referring to FIG. 6, the interconnect structure may include a downstream port, an upstream port, and one or more retimers. The downstream port may be a port included in an upstream component, and the upstream port may be a port included in a downstream component. The downstream port may interconnect components of the computing system in a downstream path. For example, the downstream port may indicate a port that is disposed in an upstream component to provide an interface for transmission from an upstream component to a downstream component. The upstream port may interconnect components of the computing system in an upstream path. For example, the upstream port may indicate a port that is disposed in a downstream component to provide an interface for transmission from the downstream component to an upstream component. Since an interconnect operates at a high speed, one or more retimers may be connected between the downstream port and the upstream port.

The retimer may serve a signal repeater which operates in a physical layer to finely tune signals from the downstream port and the upstream port. A main function of the retimer may be signal retiming. The retimer may recover a reception signal and retransmit the recovered signal by using a local clock and a new transmission equalization circuit.

In some implementations, the retimer may include two pseudo ports. The pseudo port may dynamically determine each of downstream/upstream directions. The pseudo port oriented in the downstream direction may be a downstream pseudo port. The pseudo port oriented in the upstream direction may be an upstream pseudo port.

The downstream port may include a transmitter Tx(A) and a receiver Rx(A). A retimer X may include transmitters Tx(B) and Tx(C) and receivers Rx(B) and Rx(C). A retimer Y may include transmitters Tx(D) and Tx(E) and receivers Rx(D) and Rx(E). The upstream port may include a transmitter Tx(F) and a receiver Rx(F).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter Tx(C). The receiver Rx(D) may be connected to the transmitter Tx(C), and repeat the data and the signal to the transmitter Tx(E). The receiver Rx(F) may be connected to the transmitter Tx(E).

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the transmitter Tx(B).

The downstream port, the upstream port, and the retimers may be connected through a link. In some implementations, the downstream port may acquire margin status information of a plurality of lanes included in the link through a lane margining operation. For example, the downstream port may transmit a margin command to the retimer X, the retimer Y, and the upstream port, and the retimer X, the retimer Y, and the upstream port may provide the margin status information to the downstream port in response to the margin command. The margin command and a response signal to the margin command may be transmitted through a control skip ordered set. For example, the downstream port may provide the margin command through the control skip ordered set. Also, the retimer X, the retimer Y, and the upstream port may provide the response signal to the margin command through the control skip ordered set.

The lane margining operation may be performed in all ports. The computing system may acquire margin status information in a receiver included in the port receiving the margin command through the lane margining operation of the corresponding receiver. In some implementations, the margin status information may include voltage and time associated with a receiver position. In one example, the margin status information may include margin information on a voltage and timing at a current receiver position. The lane margining operation of the receiver may be performed when the margin command is received, when the link operates at a data speed of 16.0 GT/s or more, and when the link is in an L0 state.

The lane margining operation may include issuing a command that instructs the receiver to shift a sampling spot to the left or right in a voltage timing diagram through several steps with respect to the timing or to shift the sampling spot to the top or bottom in the voltage timing diagram through several steps with respect to the voltage. The receiver may report the margin status information as a response to the margin command. The margin command may include commands indicating various operations associated with the lane margining operation.

The computing system may use a margining lane control register and a margining lane status register in each port to obtain the margin status information on the receiver. The downstream port may control the lane margining operation of the receiver by performing recording on an appropriate bit of the margining lane control register. Also, the downstream port may update the margin status information of the receiver through the margining lane status register.

A conventional lane margining operation may be controlled by only the downstream port. A conventional upstream port cannot control the lane margining operation, and may provide only the margin status information acquired through the lane margining operation. In addition, characteristics of the physical layer may vary depending on a kind of platform and whether the retimer exists. The setting of a transmitter and a receiver of the physical layer may also vary.

The disclosed technology can be implemented in some embodiments to tune the setting of a transmitter and a receiver by controlling the lane margining operation in the upstream port.

Figure 7:
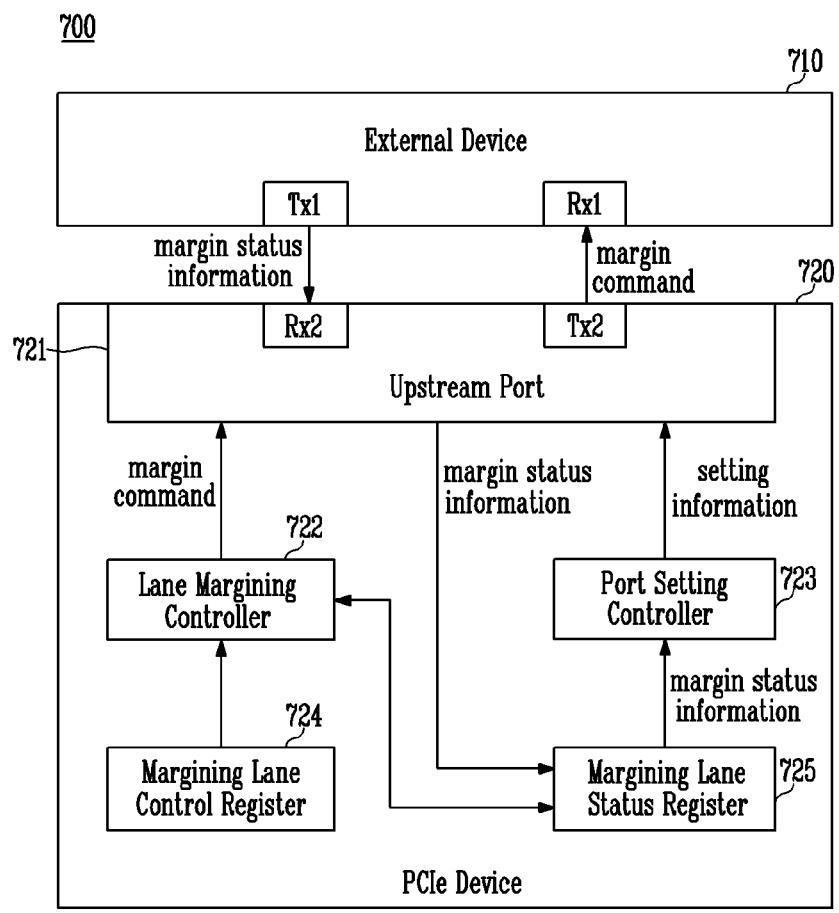
FIG. 7 is a diagram illustrating a computing system that includes a PCIe device based on an embodiment of the disclosed technology.

FIG. 7 is a diagram illustrating a computing system that includes a PCIe device based on an embodiment of the disclosed technology.

The computing system 700 based on the embodiment of the disclosed technology may include an external device 710 and a PCIe device 720.

The external device 710 may use a PCIe interface connected to the PCIe device 720 through a link. The link may include a plurality of lanes. Although FIG. 7 illustrates only one external device 710, more than one external device 710 may be connected to the PCIe device 720.

In some implementations, the external device 710 may be a device located on an upstream path. For example, the external device 710 may be an upstream component or a retimer. The external device 710 may be a device belonging to a layer upper than the PCIe device 720. Therefore, a direction in which a signal moves from the external device 710 to the PCIe device 720 may be defined as downstream, and a direction in which a signal moves from the PCIe device 720 to the external device 710 may be defined as upstream.

In some implementations, the external device 710 may include a downstream port. The downstream port may include a transmitter Tx1 and a receiver Rx1. The transmitter Tx1 included in the external device 710 may be connected to a receiver Rx2 included in the PCIe device 720, and the receiver Rx1 included in the external device 710 may be connected to a transmitter Tx2 included in the PCIe device 720.

In some implementations, the PCIe device 720 may be a downstream component located on a downstream path.

The PCIe device 720 may include an upstream port 721, a lane margining controller 722, a port setting controller 723, a margining lane control register 724, and a margining lane status register 725.

The upstream port 721 may be connected to the external device 710 through the link. Specifically, the upstream port 721 may communicate data or a signal with the downstream port included in the external device 710. The upstream port 721 may include the transmitter Tx2 and the receiver Rx2.

The lane margining controller 722 may control a lane margining operation. The lane margining controller 722 may control the upstream port 721 to transmit a margin command for requesting the lane margining operation to the external device 710. The upstream port 721 may generate the margin command and transmit the margin command through the transmitter.

The lane margining operation may be an operation of acquiring margin status information of each of the plurality of lines included in the link. The margin status information may include at least one of eye margin information and error information. The eye margin information may include an indication regarding the quality of signal transmitted/received through the plurality of lanes. The error information may include information associated with an error occurring from the lane margining operation. For example, the margin status information may include a timing step number, a maximum timing offset, a voltage step number, a maximum voltage offset, a voltage sampling ratio, a timing sampling ratio, a maximum lane number (e.g., a maximum lane number with which the lane margining operation can be simultaneously performed), an independent error sampler (e.g., whether any error has occurred due to the lane margining operation), an error number (e.g., a number of errors which have occurred during the lane margining operation), a sample number (e.g., a number of margined bits), and the like.

In some implementations, the margin command and the margin status information may be transmitted through a control skip ordered set.

A skip ordered set may be used in clock tolerance compensation. Specifically, the skip ordered set may be used to compensate for a frequency difference between bit rates at two ends of the link. An elastic buffer which performs the compensation may be included in a logical sub-block of a physical layer at a reception side. A transmission interval of the skip ordered set may be set based on predesigned transmission and the absolute value of a reception clock frequency difference.

The elastic buffer may temporarily store data to be transmitted or temporarily store data to be received. Specifically, the elastic buffer may be included in each of transmission and reception sides. The elastic buffer may temporarily store a skip ordered set and a data block.

In some implementations, the lane margining controller 722 may increase/decrease the transmission interval of the skip ordered set, based on a transmission history of the skip ordered set. The transmission history may include a transmission interval of the skip ordered set, a recovery state entrance frequency corresponding to a change in the transmission interval or the transmission interval, and the like. For example, the lane margining controller 722 may calculate a frequency of recovery state entrance corresponding to the transmission interval, and increase/decrease the transmission interval of the skip ordered set, based on the frequency of the recovery state entrance. In another example, the lane margining controller 722 may fix the transmission interval of the skip ordered set, when a request for the recovery state entrance is not received for a predetermined time.

Also, the lane margining controller 722 may increase/decrease the transmission interval of the skip ordered set, based on the state of the elastic buffer included in the external device 710. For example, the transmission side and the reception side operate at different frequencies, an error of overflow or underflow may occur. When the error of the overflow or underflow occurs, the computing system 700 may enter into the recovery state. For instance, communication between PCIe devices may be suspended, and the problem of large performance deterioration and data loss may occur in a PCIe system. Therefore, the lane margining controller 722 may request information representing the state of the elastic buffer included in the external device 710 through the margin command. Specifically, the lane margining controller 722 may request the external device 710 of the information representing the state of the elastic buffer by transmitting the margin command having a vendor defined type to the external device 710. The lane margining controller 722 may increase/decrease the transmission interval of the skip ordered set, based on the received state of the elastic buffer of the external device 710.

In some implementations, the external device 710 may perform a lane margining operation in response to the margin command. The external device 710 may acquire margin status information through the lane margining operation, and store the acquired margin status information. In addition, the lane margining controller 722 may control the upstream port 721 to receive the margin status information from the external device 710. The upstream port 721 may receive the margin status information through the receiver.

The port setting controller 723 may determine a setting of the upstream port 721, based on the margin status information. The port setting controller 723 may adjust characteristics of a signal transmitted/received through the link by controlling settings of the transmitter and the receiver, which are included in the upstream port 721, based on the margin status information. For example, the port setting controller 723 may control the settings of the transmitter and the receiver, which are connected to each lane, to improve the quality of signals transmitted/received through the lanes and satisfy specified requirements.

The margining lane control register 724 may store information associated with the margin command. For example, the margining lane control register 724 may include a receiver number, a margin type, a usage model, a margin payload, and the like. The receiver number may be information for identifying a receiver receiving the margin command. The margin type may be information representing the type of a margin. The usage model may be information representing whether the lane margining operation is to be performed. The margin payload may be information representing an operation to be instructed through the margin command.

The margining lane status register 725 may store the margin status information. For example, the margining lane status register 725 may include a receiver number status, a margin type status, a usage model status, a margin payload status, and the like.

The lane margining controller 722 may control the lane margining operation of the computing system 700 by using the margining lane control register 724 and the margining lane status register 725. For example, the lane margining controller 722 may record information associated with the margin command in the margining lane control register 724. Also, the lane margining controller 722 may record the margin status information in the margining lane status register 725.

In some implementations, the lane margining controller 722 may control the upstream port 721 to transmit a transmitter setting request to the external device 710. The transmitter setting request may be used to request an operation for determining a setting of the transmitter included in the external device 710. For example, a setting of the receiver Rx2 included in the upstream port 721 may be determined based on a setting of the transmitter Tx1 included in the external device 710. When errors are detected frequently in the receiver Rx2 or when the setting of the receiver Rx2 according to the setting of the transmitter Tx1 does not satisfy a required value of the system, it is necessary to perform an operation for updating the setting of the receiver Rx2. The PCIe device 720 may allow the setting of the transmitter Tx1 to be re-determined by transmitting a transmitter setting request to the external device 710. For instance, the PCIe device 720 may induce a transmitter setting operation of the external device 710 through the transmitter setting request. In some implementations, upon receiving a transmitter setting request for requesting the external device 710 to provide transmitter setting information, the external device 710 may perform a transmitter setting operation to obtain and/or provide the transmitter setting information.

The external device 710 may determine the setting of the transmitter Tx1, based on the transmitter setting request. Subsequently, the PCIe device 720 may control the upstream port 721 to receive transmitter setting information from the external device 710. The transmitter setting information may include information associated with the setting of the transmitter included in the external device 710. For example, the transmitter setting information may include a hint associated with the setting of the transmitter. The PCIe device 720 may determine a setting of the receiver included in the upstream port 721, based on the transmitter setting information.

In some implementations, the transmitter setting request and the transmitter setting information may be transmitted through the margin command having the vendor defined type.

Figure 8:
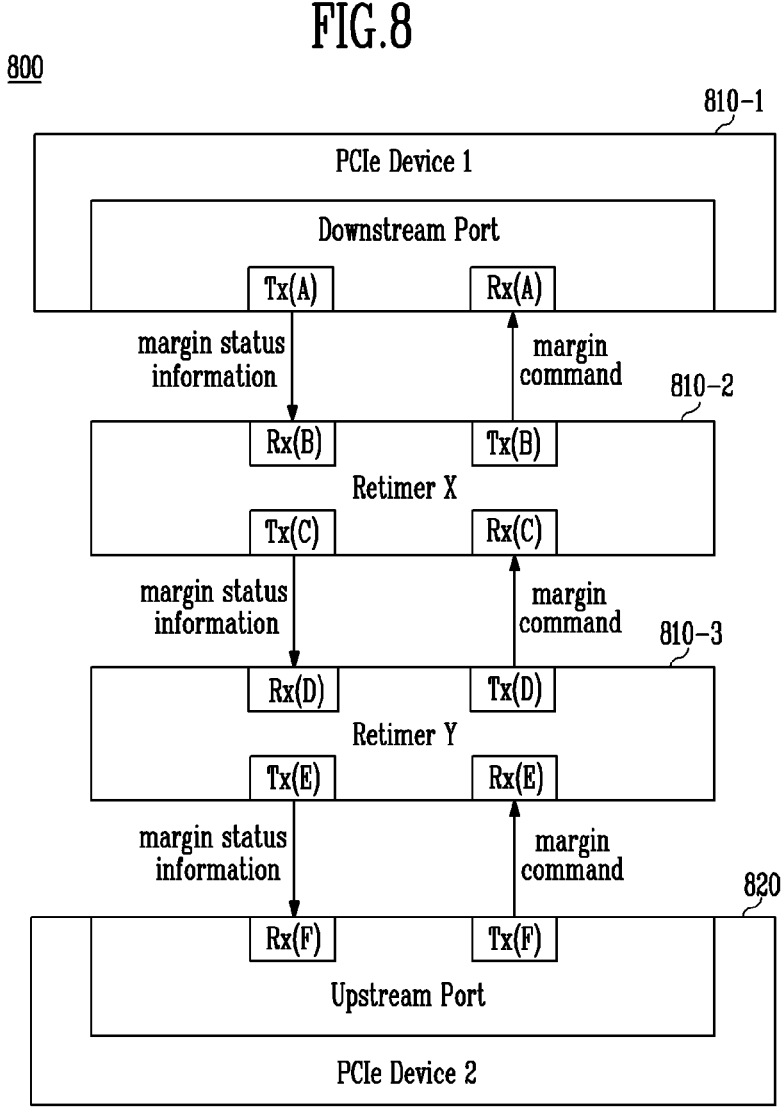
FIG. 8 is a diagram illustrating an operation for determining a setting of a transmitter controlled by an upstream port based on an embodiment of the disclosed technology.

FIG. 8 is a diagram illustrating an operation for determining a setting of a transmitter controlled by an upstream port based on an embodiment of the disclosed technology.

Referring to FIG. 8, a computing system 800 may include a first PCIe device 810-1, retimers 810-2 and 810-3, and a second PCIe device 820. The first PCIe device 800-1 and the retimers 810-2 and 810-3 may represent the external device 710 shown in FIG. 7. The second PCIe device 820 may represent the PCIe device 720 shown in FIG. 7.

In some implementations, the first PCIe device 810-1 may include a downstream port. The downstream port may include a transmitter Tx(A) and a receiver Rx(A). A retimer X 810-2 may include transmitters Tx(B) and Tx(C) and receivers Rx(B) and Rx(C). A retimer Y 810-3 may include transmitters Tx(D) and Tx(E) and receivers Rx(D) and Rx(E). The second PCIe device 820 may include an upstream port. The upstream port may be connected to the downstream port through a link. The upstream port may include a transmitter Tx(F) and a receiver Rx(F).

In some implementations, the retimers 810-2 and 810-3 may be connected between the first PCIe device 810-1 and the second PCIe device 820.

In some implementations, each of the retimers 810-2 and 810-3 may include a downstream pseudo port. For example, a downstream pseudo port of the retimer X 810-2 may include the transmitter Tx(C) and the receiver Rx(C). A downstream pseudo port of the retimer Y 810-3 may include the transmitter Tx(E) and the receiver Rx(E). Also, each of the retimers 810-2 and 810-3 may include an upstream pseudo port. For example, an upstream pseudo port of the retimer X 810-2 may include the transmitter Tx(B) and the receiver Rx(B). An upstream pseudo portion of the retimer Y 810-3 may include the transmitter Tx(D) and the receiver Rx(D).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter Tx(C). The receiver Rx(D) may be connected to the transmitter Tx(C), and repeat the data and the signal to the transmitter Tx(E). The receiver Rx(F) may be connected to the transmitter Tx(E).

The downstream pseudo ports and the upstream pseudo ports of the retimers 810-2 and 810-3 may be connected to the upstream port and the downstream port through the link.

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the transmitter Tx(B).

In some implementations, each of the first PCIe device 810-1 and the second PCIe device 820 may include a margining lane control register and a margining lane status register. Each of the first PCIe device 810-1 and the second PCIe device 820 may record information associated with a margin command in the margining lane control register, and record margin status information in the margining lane status register.

In some implementations, the second PCIe device 820 may transmit a margin command to the first PCIe device 810-1 and the retimers 810-2 and 810-3 through the upstream port. For example, the upstream port may generate a margin command. The margin command may include information for identifying any one of the receivers included in the first PCIe device 810-1, the second PCIe device 820, and the retimers 810-2 and 810-3. The upstream port may provide the margin command to the first PCIe device 810-1 and the retimers 810-2 and 810-3 through a control skip ordered set.

The first PCIe device 810-1 and the retimers 810-2 and 810-3 may acquire margin status information of each of a plurality of lanes in response to the margin command. For example, the first PCIe device 810-1 and the retimers 810-2 and 810-3 may acquire margin status information by performing a lane margining operation corresponding to the margin command. The first PCIe device 810-1 and the retimers 810-2 and 810-3 may transmit the margin status information to the second PCIe device 820 through the control skip ordered set in response to the margin command. For example, the downstream port may transmit the margin status information to the upstream port through the control skip ordered set in response to the margin command.

In addition, the second PCIe device 820 may receive the margin status information as a response to the margin command from the first PCIe device 810-1 and the retimers 810-2 and 810-3. For example, the upstream port may receive the margin status information as a response to the margin command from the downstream port. The second PCIe device 820 may determine a setting of the transmitter Tx(F) included in the upstream port, based on the margin status information. Subsequently, the first PCIe device 810-1 may determine a setting of the receiver Rx(A) included in the downstream port, based on the setting of the transmitter Tx(F), which is determined by the second PCIe device 820. In addition, the retimers 810-2 and 810-3 may determine settings of the receiver Rx(C) and the receiver Rx(E), based on the setting of the transmitter Tx(F), which is determined by the second PCIe device 820.

Thus, based on the embodiment of the disclosed technology, the lane margining operation is controlled through the upstream port, so that settings of the transmitter and the receiver, which are included in the upstream port, can be tuned in real time. Accordingly, the state of the link can be optimized.

Figure 9:
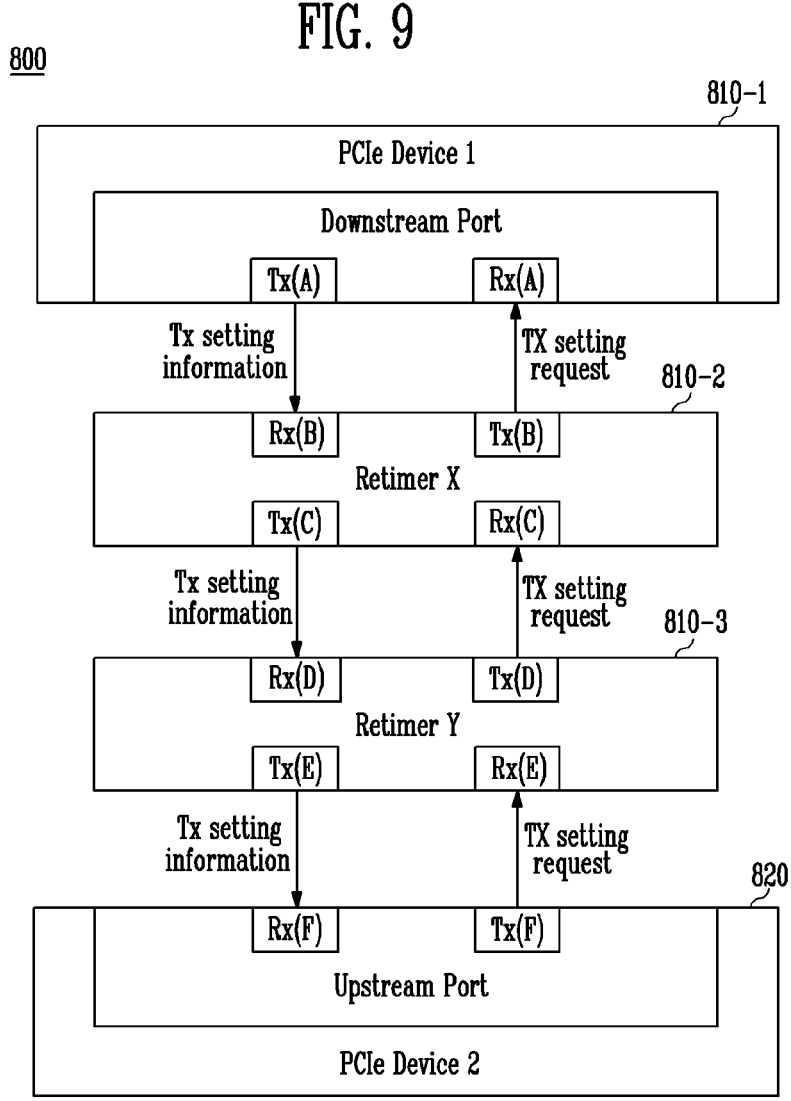
FIG. 9 is a diagram illustrating an operation for determining a setting of a receiver controlled by an upstream port based on an embodiment of the disclosed technology.

FIG. 9 is a diagram illustrating an operation for determining a setting of a receiver controlled by an upstream port based on an embodiment of the disclosed technology.

Referring to FIG. 9, the computing system 800 may include a first PCIe device 810-1, retimers 810-2 and 810-3, and a second PCIe device 820. The first PCIe device 800-1 and the retimers 810-2 and 810-3 may represent the external device 710 shown in FIG. 7. The second PCIe device 820 may represent the PCIe device 720 shown in FIG. 7.

In some implementations, the first PCIe device 810-1 may include a downstream port. The downstream port may include a transmitter Tx(A) and a receiver Rx(A). A retimer X 810-2 may include transmitters Tx(B) and Tx(C) and receivers Rx(B) and Rx(C). A retimer Y 810-3 may include Tx(D) and Tx(E) and receivers Rx(D) and Rx(E). The second PCIe device 820 may include an upstream port. The upstream port may be connected to the downstream port through a link. The upstream port may include a transmitter Tx(F) and a receiver Rx(F).

In some implementations, the retimers 810-2 and 810-3 may be connected between the first PCIe device 810-1 and the second PCIe device 820.

In some implementations, each of the retimers 810-2 and 810-3 may include a downstream pseudo port. For example, a downstream pseudo port of the retimer X 810-2 may include the transmitter Tx(C) and the receiver Rx(C). A downstream pseudo port of the retimer Y 810-3 may include the transmitter Tx(E) and the receiver Rx(E). Also, each of the retimers 810-2 and 810-3 may include an upstream pseudo port. For example, an upstream pseudo port of the retimer X 810-2 may include the transmitter Tx(B) and the receiver Rx(B). An upstream pseudo portion of the retimer Y 810-3 may include the transmitter Tx(D) and the receiver Rx(D).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter Tx(C). The receiver Rx(D) may be connected to the transmitter Tx(C), and repeat the data and the signal to the transmitter Tx(E). The receiver Rx(F) may be connected to the transmitter Tx(E).

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the Tx(B).

In some implementations, each of the first PCIe device 810-1 and the second PCIe device 820 may include a margining lane control register and a margining lane status register. Each of the first PCIe device 810-1 and the second PCIe device 820 may record information associated with a margin command in the margining lane control register, and record margin status information in the margining lane status register.

The second PCIe device 820 may transmit a transmitter setting request to the downstream port through the upstream port. The transmitter setting request may be used to request an operation for determining a setting of the transmitter included in the downstream port. For example, a setting of the receiver Rx(F) included in the upstream port may be determined according to a setting of the transmitter Tx(A) included in the downstream port. When the occurrence frequency of an error detected in the receiver Rx(F) is increased or when the setting of the receiver Rx(F) according to the setting of the transmitter Tx(A) does not satisfy a required value of the system, it is necessary to perform an operation for updating the setting of the receiver Rx(F). The second PCIe device 820 may allow the setting of the transmitter Tx(A) to be re-determined by transmitting the transmitter setting request to the downstream port. For instance, the second PCIe device 820 may induce a transmitter setting operation of the downstream port through the transmitter setting request.

The first PCIe device 810-1 may determine a setting of the transmitter included in the downstream port, based on the transmitter setting request. Subsequently, the second PCIe device 820 may receive transmitter setting information from the first PCIe device 810-1 through the upstream port. The transmitter setting information may include information associated with the setting of the transmitter included in the downstream port. For example, the transmitter setting information may include a hint associated with the setting of the transmitter. The second PCIe device 820 may determine a setting of the receiver included in the upstream port, based on the transmitter setting information.

In some implementations, the transmitter setting request and the transmitter setting information may be transmitted through the margin command having a vendor defined type.

Figure 10:
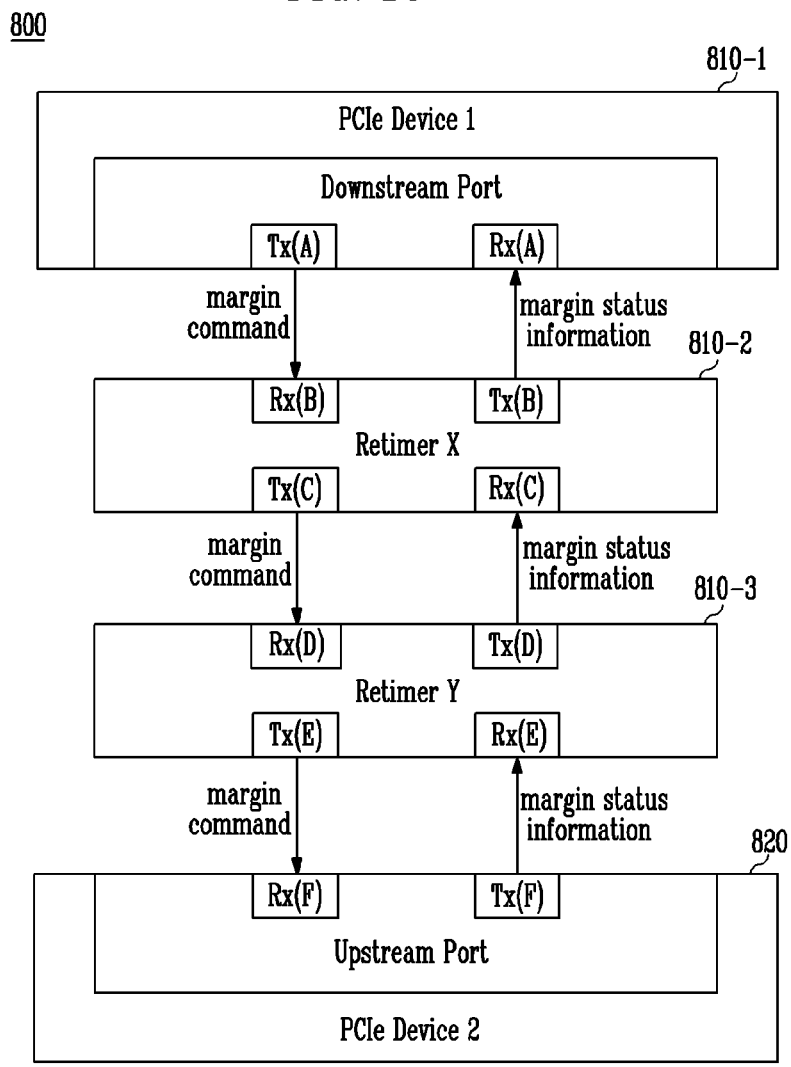
FIG. 10 is a diagram illustrating an operation for determining a setting of a transmitter controlled by a downstream port based on an embodiment of the disclosed technology.

FIG. 10 is a diagram illustrating an operation for determining a setting of a transmitter controlled by a downstream port based on an embodiment of the disclosed technology.

Referring to FIG. 10, the computing system 800 may include a first PCIe device 810-1, retimers 810-2 and 810-3, and a second PCIe device 820. The first PCIe device 800-1 and the retimers 810-2 and 810-3 may represent the external device 710 shown in FIG. 7. The second PCIe device 820 may represent the PCIe device 720 shown in FIG. 7.

In some implementations, the first PCIe device 810-1 may include a downstream port. The downstream port may include a transmitter Tx(A) and a receiver Rx(A). A retimer X 810-2 may include transmitters Tx(B) and Tx(C) and receivers Rx(B) and Rx(C). A retimer Y 810-3 may include transmitters Tx(D) and Tx(E) and receivers Rx(D) and Rx(E). The second PCIe device 820 may include an upstream port. The upstream port may be connected to the downstream port through a link. The upstream port may include a transmitter Tx(F) and a receiver Rx(F).

In some implementations, the retimers 810-2 and 810-3 may be connected between the first PCIe device 810-1 and the second PCIe device 820.

In some implementations, each of the retimers 810-2 and 810-3 may include a downstream pseudo port. For example, a downstream pseudo port of the retimer X 810-2 may include the transmitter Tx(C) and the receiver Rx(C). A downstream pseudo port of the retimer Y 810-3 may include the transmitter Tx(E) and the receiver Rx(E). Also, each of the retimers 810-2 and 810-3 may include an upstream pseudo port. For example, an upstream pseudo port of the retimer X 810-2 may include the transmitter Tx(B) and the receiver Rx(B). An upstream pseudo portion of the retimer Y 810-3 may include the transmitter Tx(D) and the receiver Rx(D).

In some implementations, a path through which data or a signal moves from the downstream port to the upstream port may be defined as a downstream path. On the downstream path, the receiver Rx(B) may be connected to the transmitter Tx(A), and repeat the data and the signal to the transmitter Tx(C). The receiver Rx(D) may be connected to the transmitter Tx(C), and repeat the data and the signal to the transmitter Tx(E). The receiver Rx(F) may be connected to the transmitter Tx(E).

The downstream pseudo ports and the upstream pseudo ports of the retimers 810-2 and 810-3 may be connected to the upstream port and the downstream port through the link.

In some implementations, a path through which data or a signal moves from the upstream port to the downstream port may be defined as an upstream path. On the upstream path, the receiver Rx(E) may be connected to the transmitter Tx(F), and repeat the data and the signal to the transmitter Tx(D). The receiver Rx(C) may be connected to the transmitter Tx(D), and repeat the data and the signal to the transmitter Tx(B). The receiver Rx(A) may be connected to the transmitter Tx(B).

In some implementations, each of the first PCIe device 810-1 and the second PCIe device 820 may include a margining lane control register and a margining lane status register. The Each of the first PCIe device 810-1 and the second PCIe device 820 may record information associated with a margin command in the margining lane control register, and record margin status information in the margining lane status register In some implementations, the first PCIe device 810-1 may transmit a margin command to the second PCIe device 820 and the retimers 810-2 and 810-3 through the downstream port. For example, the downstream port may generate a margin command. The margin command may include information for identifying any one of the receivers included in the first PCIe device 810-1, the second PCIe device 820, and the retimers 810-2 and 810-3. The downstream port may provide the margin command to the second PCIe device 820 and the retimers 810-2 and 810-3 through a control skip ordered set.

The second PCIe device 820 and the retimers 810-2 and 810-3 may acquire margin status information of each of a plurality of lanes in response to the margin command. For example, the second PCIe device 820 and the retimers 810-2 and 810-3 may acquire margin status information by performing a lane margining operation corresponding to the margin command. The second PCIe device 820 and the retimers 810-2 and 810-3 may transmit the margin status information to the first PCIe device 810-1 through the control skip ordered set in response to the margin command. For example, the upstream port may transmit the margin status information to the downstream port through the control skip ordered set in response to the margin command.

In addition, the first PCIe device 810-1 may receive the margin status information as a response to the margin command from the second PCIe device 820 and the retimers 810-2 and 810-3. For example, the downstream port may receive the margin status information as a response to the margin command from the upstream port. The first PCIe device 810-1 may determine a setting of the transmitter Tx(A) included in the upstream port, based on the margin status information. Subsequently, the second PCIe device 820 may determine a setting of the receiver Rx(F) included in the upstream port, based on the setting of the transmitter Tx(A), which is determined by the first PCIe device 810-1. In addition, the retimers 810-2 and 810-3 may determine settings of the receiver Rx(C) and the receiver Rx(E), based on the setting of the transmitter Tx(A), which is determined by the first PCIe device 810-1.

Thus, based on the embodiment of the disclosed technology, the lane margining operation is controlled through the downstream port in addition to the upstream port, so that a means for optimizing the state of the link can be diversified.

FIG. 11 is a flowchart illustrating a method of determining a setting of an upstream port based on an embodiment of the disclosed technology.

The method shown in FIG. 11 may be performed by, for example, the computing system shown in FIG. 7 or 8. Hereinafter, for convenience of description, the method will be described based on the computing system 800 shown in FIG. 8.

In operation S1101, the computing system 800 may transmit a margin command for requesting a lane margining operation to the first PCIe device and the retimers, in the second PCIe device.

Margin status information may include eye margin information, error information, or others. In some implementations, the eye margin information may include an indication regarding the quality of signal transmitted/received through the plurality of lanes. In some implementations, the error information may include information associated with an error occurring from the lane margining operation In operation S1103, the computing system 800 may perform the lane margining operation, in the first PCIe device and the retimers. In some implementations, the lane margining operation may be performed to acquire margin status information that indicates a margin of each of the plurality of lanes.

In operation S1105, the computing system 800 may receive margin status information of each of the plurality of lanes from the first PCIe device and the retimers, in the second PCIe device.

In operation S1107, the computing system 800 may determine a setting of the upstream port, based on the margin status information, in the second PCIe device.

The computing system 800 may determine a setting of the transmitter included in the second PCIe device, based on the margin status information.

FIG. 12 is a flowchart illustrating a method of determining a setting of a receiver based on an embodiment of the disclosed technology.

The method shown in FIG. 12 may be performed by, for example, the computing system shown in FIG. 7 or 8. Hereinafter, for convenience of description, the method will be described based on the computing system 800 shown in FIG. 8.

In operation S1201, the computing system 800 may transmit a transmitter setting request to the first PCIe device, in the second PCIe device.

In operation S1203, the computing system 800 may perform a transmitter setting operation, in the first PCIe device. In some implementations, the first PCIe device may perform the transmitter setting operation to obtain transmitter setting information.

In operation S1205, the computing system 800 may receive the transmitter setting information from the first PCIe device, in the second PCIe device. The transmitter setting information may include information associated with a setting of the transmitter included in the first PCIe device.

In operation S1207, the computing system 800 may determine a setting of the receiver, based on the transmitter setting information, in the second PCIe device.

FIG. 13 is a flowchart illustrating a method of determining a setting of a downstream port based on an embodiment of the disclosed technology.

The method shown in FIG. 13 may be performed by, for example, the computing system shown in FIG. 7 or 8. Hereinafter, for convenience of description, the method will be described based on the computing system 800 shown in FIG. 8.

In operation S1301, the computing system 800 may transmit a margin command for requesting a lane margining operation to the second PCIe device and the retimers, in the first PCIe device.

Margin status information may include eye margin information, error information, or others.

In operation S1303, the computing system 800 may perform the lane margining operation, in the second PCIe device and the retimers.

In operation S1305, the computing system 800 may receive margin status information of each of the plurality of lanes from the second PCIe device and the retimers, in the first PCIe device.

In operation S1307, the computing system 800 may determine a setting of the downstream port, based on the margin status information, in the first PCIe device.

The computing system 800 may determine a setting of the transmitter included in the first PCIe device, based on the margin status information.

In some embodiments of the disclosed technology, there can be provided a PCIe device capable of controlling a lane margining operation in an upstream port, and a computing system that includes the PCIe device.

In some embodiments of the disclosed technology, a lane margining operation is controlled in an upstream port, so that setting of a transmitter and a receiver, which are included in the upstream port, can be tuned in real time. Accordingly, the state of a link connecting PCIe devices can be optimized.

In some implementations, some of the operations discussed above may be selectively performed or omitted. In each embodiment, the sequence of the operations may be modified.

Only limited examples of implementations or embodiments of the disclosed technology are described or illustrated. Variations and enhancements for the disclosed implementations or embodiments and other implementations or embodiments are possible based on what is disclosed and illustrated in this patent document.

What is claimed is:

1. A device for performing communication between components in a computing system, comprising:
   an upstream port structured to receive data from or transmit data to one or more external devices located on an upstream path through a link including a plurality of lanes structured to include differential signaling pairs for receiving and transmitting data;
   a margining lane control register configured to store information associated with a margin command for requesting a lane margining operation to acquire margin status information to indicate a margin of each of the plurality of lanes;
   a margining lane status register configured to store the margin status information;
   a lane margining controller coupled to the upstream port and configured to record the information associated with the margin command in the margining lane control register, control the upstream port to transmit the margin command recorded in the margining lane control register to the one or more external devices, control the upstream port to receive the margin status information from the external devices, and record the margin status information received through the upstream port in the margining lane status register; and
   a port setting controller configured to receive the margin status information from the margining lane status register and coupled to be in communication with the upstream port to determine a setting of the upstream port based on the margin status information.

2. The device of claim 1, wherein the margin status information includes at least one of eye margin information or error information, the eye margin information including an indication of a quality of a signal transmitted or received through each of the plurality of lanes, the error information including information associated with an error occurring from the lane margining operation.

3. The device of claim 1, wherein the margin command and the margin status information are transmitted through a control skip ordered set.

4. The device of claim 1, wherein the upstream port includes:
   a transmitter configured to transmit the margin command; and
   a receiver configured to receive the margin status information.

5. The device of claim 4, wherein the port setting controller is configured to determine a setting of the transmitter based on the margin status information.

6. The device of claim 4, wherein the lane margining controller is configured to:
   transmit, to the external devices, a transmitter setting request for requesting the external devices to provide transmitter setting information by performing a transmitter setting operation; and control the upstream port to receive, from the external devices, the transmitter setting information associated with a setting of a transmitter included in the external devices, and wherein the port setting controller determines a setting of the receiver based on the transmitter setting information.

7. The device of claim 6, wherein the transmitter setting request and the transmitter setting information are transmitted through the margin command having a vendor defined type.

8. The device of claim 1, wherein the device includes a peripheral component interconnect express (PCIe) device that is used as a downstream component located on a downstream path, and wherein the external devices are upstream components located on the upstream path or one or more retimers.

9. A computing system comprising:

a first device that is structured to include a downstream port and to receive and transmit data via the downstream port according to peripheral component interconnect express (PCIe) standard; and a second device structured to include an upstream port connected to the downstream port of the first device through a link including a plurality of lanes, a margining lane control register configured to store information associated with a margin command and a margining lane status register configured to store margin status information that indicates a margin of each of the plurality of lanes, wherein the second device is configured to:

receive and transmit data with the first device via the upstream port according to the peripheral component interconnect express standard;

record the information associated with the margin command in the margining lane control register;

transmit the margin command recorded in the margining lane control register to the first device through the upstream port;

receive the margin status information as a response to the margin command from the first device through the upstream port;

record the margin status information received through the upstream port in the margining lane status register; and determine a setting of the upstream port based on the margin status information recorded in the margining lane status register.

10. The computing system of claim 9, wherein the first device is configured to:

acquire the margin status information by performing a lane margining operation corresponding to the margin command; and transmit the margin status information to the second device through a control skip ordered set in response to the margin command.

11. The computing system of claim 9, wherein the margin status information includes at least one of eye margin information or error information, the eye margin information including an indication of a quality of a signal transmitted or received through each of the plurality of lanes, the error information including information associated with an error occurring from a lane margining operation corresponding to the margin command.

12. The computing system of claim 9, wherein the second device is configured to transmit the margin command through a control skip ordered set.

13. The computing system of claim 9, further comprising one or more retimers connected to the downstream port and the upstream port through the link.

14. The computing system of claim 13, wherein the margin command includes information for identifying any one of receivers included in the first device, the second device, and the retimers.

15. The computing system of claim 13, wherein the second device is configured to receive the margin status information as a response to the margin command from the retimers.

16. The computing system of claim 15, wherein the second device is configured to determine a setting of a transmitter included in the upstream port, based on the margin status information, and wherein the first device and the retimers are configured to respectively determine settings of receivers included in the downstream port and the retimers, based on the setting of the transmitter included in the upstream port.

17. The computing system of claim 9, wherein the second device is configured to transmit, to the first device, a transmitter setting request for requesting a transmitter setting operation of the downstream port through the upstream port.

18. The computing system of claim 17, wherein the first device is configured to determine a setting of a transmitter included in the downstream port, based on the transmitter setting request, and wherein the second device is configured to:

receive transmitter setting information associated with the setting of the transmitter included in the downstream port from the first device through the upstream port; and determine a setting of a receiver included in the upstream port based on the transmitter setting information.

* * * * *